F. C. Richer.
Wrench.
No. 89,690.        Patented May 4, 1869.
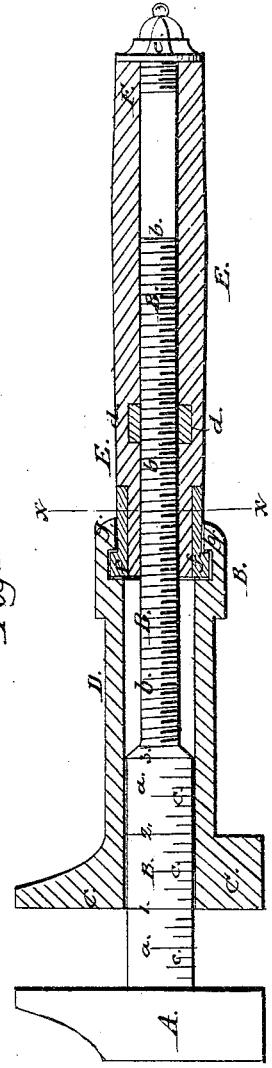
Inventor:
F. C. Richer.

United States Patent Office.

F. C. RICHER, OF GILMER, TEXAS.

Letters Patent No. 89,690, dated May 4, 1869.

IMPROVEMENT IN WRENCH.

The Schedule referred to in these Letters Patent and making part of the same.

*To all whom it may concern:*

Be it known that I, F. C. RICHER, of Gilmer, in the county of Upshur, and State of Texas, have invented a new and improved Monkey-Wrench; and I do hereby declare that the following is a full, clear, and exact description thereof, which will enable others skilled in the art to make and use the same, reference being had to the accompanying drawing, forming part of this specification, in which—

Figure 1 represents a longitudinal sectional view of my improved monkey-wrench.

Figure 2 is a transverse section of the same, taken on the plane of the line $x\,x$, fig. 1.

Similar letters of reference indicate corresponding parts.

This invention relates to a new monkey-wrench, which is operated by turning the handle, and has for its object to arrange as few parts in as simple a manner as possible, so that the device will be substantial and not apt to get out of repair, and also so that the handle may be readily detached from the shank; and The invention consists in the combination and construction of the various parts, as will be hereinafter more fully described.

A, in the drawing, represents the upper jaw of my improved monkey-wrench.

B is its shank.

The same is nearly as long as the whole wrench, and is polygonal at its upper part, $a$, and in form of a screw, $b$, at its main lower part.

C is the lower jaw, and

D, its shank.

The lower jaw and shank are hollow, the aperture being polygonal, to fit the part $a$, of the shank B.

On the part $a$ of said shank B is arranged a graduated scale, as at $c$, in the drawing, the same indicating the correct distance between the jaws, as shown.

E is the handle.

It is hollow, tubular, made of metal, wood, or other suitable material, and has a nut, $d$, formed, or firmly secured in it, as may be desired.

It is, by means of this nut, screwed upon the part $b$ of the shank B.

The lower end is closed by a plug, $e$, or otherwise.

A shoulder, $f$, is formed at or near the upper end of the handle E.

$g\,g$ are two hooks, formed on the lower end of the shank D, on opposite sides of the same, their edges being straight, as in fig. 2, so that they can be fitted over the shoulder $f$, by a side motion, when the screw $b$ is not yet secured to the handle.

When the upper jaw is not connected with the lower jaw and handle, it will, with its shank, form a convenient hammer.

When screwed to the handle, it will, by its polygonal shank-portion, $a$, prevent the lower jaw from turning, so that the handle, when turned, will move with the lower jaw longitudinally, to vary the distance between the jaws at will.

The three parts of which this wrench is constructed are all strong and substantial, and can be readily taken apart.

When one part is worn, it can be easily replaced by another, without requiring the renewal of the other parts.

Having thus described my invention,

What I claim as new, and desire to secure by Letters Patent, is—

The combination of the hollow handle E, screw-plug $e$, screw-nut $d$, the lips $f$, formed on the inner end of said handle, and the jaws D and A, the latter having the graduated shank B, all constructed and arranged as specified.

F. C. RICHER.

Witnesses:
FRANK BLOCKLEY,
ALEX. F. ROBERTS.